(12) United States Patent
Wang et al.

(10) Patent No.: US 9,609,535 B2
(45) Date of Patent: *Mar. 28, 2017

(54) METHOD AND APPARATUS FOR TESTING RADIO FREQUENCY INDEX OF ACTIVE ANTENNA SYSTEM

(71) Applicant: ZTE CORPORATION, Shenzhen, Guangdong Province (CN)

(72) Inventors: Boming Wang, Shenzhen (CN); Xiangling Li, Shenzhen (CN); Changjiang Cao, Shenzhen (CN); Xiangzi Han, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/404,758

(22) PCT Filed: Jul. 24, 2013

(86) PCT No.: PCT/CN2013/080038
§ 371 (c)(1),
(2) Date: Dec. 1, 2014

(87) PCT Pub. No.: WO2013/185684
PCT Pub. Date: Dec. 19, 2013

(65) Prior Publication Data
US 2015/0126133 A1    May 7, 2015

(30) Foreign Application Priority Data

Jul. 27, 2012  (CN) .......................... 2012 1 0264054

(51) Int. Cl.
*H04B 17/00* (2015.01)
*H04W 24/08* (2009.01)
(Continued)

(52) U.S. Cl.
CPC ............ *H04W 24/08* (2013.01); *H04B 17/12* (2015.01); *H04B 17/15* (2015.01)

(58) Field of Classification Search
CPC ...... H04B 17/21; H04B 7/0617; H04B 17/12; H04B 7/04; H04B 17/29; H04B 17/364;
(Continued)

(56) References Cited

U.S. PATENT DOCUMENTS 5,477,229 A    12/1995  Caille et al.
2002/0089447 A1  7/2002  Li

FOREIGN PATENT DOCUMENTS

CN    102395226 A    3/2012
CN    102593570 A    7/2012
(Continued)

OTHER PUBLICATIONS

European Search Report dated Jun. 10, 2015 of European patent Application No. 13805112.3.
(Continued)

*Primary Examiner* — Sonny Trinh
*Assistant Examiner* — Angelica M Perez
(74) *Attorney, Agent, or Firm* — Plumsea Law Group, LLC

(57) ABSTRACT

A method and apparatus for testing a radio frequency index of an active antenna system are provided. In the method, a tested active antenna system is placed in a test cover for performing radio frequency index testing, wherein, the test cover includes an antenna array part and a passive network part, and the antenna array part and the antenna feeder part of the tested active antenna system are the same. The method for testing includes: monomer calibration of the test cover; near-field coupling calibration; and radio frequency index testing. With the above-mentioned method and apparatus for testing the radio frequency index of the active antenna
(Continued)

system, the radio frequency index of the active antenna system can be directly and effectively measured without need of adding an extra test interface.

15 Claims, 7 Drawing Sheets

(51) Int. Cl.
*H04B 17/12* (2015.01)
*H04B 17/15* (2015.01)

(58) Field of Classification Search
CPC .. H04B 17/0085; H04B 7/0697; H04B 7/086; H04B 17/15
USPC ........................ 455/67.16, 41.1, 67.11–67.15
See application file for complete search history.

(56) References Cited

FOREIGN PATENT DOCUMENTS

| CN | 102830298 A | 12/2012 |
| CN | 102857309 A | 1/2013 |
| CN | 102857310 A | 1/2013 |
| EP | 2469651 A1 | 6/2012 |
| JP | S62237365 A | 10/1987 |
| JP | 2005017241 A | 1/2005 |
| RU | 2265263 C2 | 11/2005 |
| RU | 130089 U1 | 7/2013 |
| WO | 9534103 A1 | 12/1995 |
| WO | 01/06595 A2 | 1/2001 |
| WO | 2007/112546 A1 | 10/2007 |
| WO | WO 2007/112546 * | 11/2007 |
| WO | 2010131409 A1 | 11/2010 |
| WO | 2011097900 A1 | 8/2011 |

OTHER PUBLICATIONS

Office Action dated Jan. 26, 2016 from Japanese Patent Appl. No. 2015-515387.

Acceptance Decision for Application No. RU2014149012/28, mailed on Feb. 9, 2016, along with listing of allowed claims, 15 pages.

Search Report for Application No. RU2014149012/28, mailed on Feb. 9, 2016, 4 pages.

* cited by examiner

METHOD AND APPARATUS FOR TESTING RADIO FREQUENCY INDEX OF ACTIVE ANTENNA SYSTEM

CROSS-REFERENCE TO RELATED APPLICATION(S)

This application is the U.S. National Phase application of PCT application number PCT/CN2013/080038 having a PCT filing date of Jul. 24, 2013, which claims priority of Chinese patent application 201210264054.X filed on Jul. 27 2012, the disclosures of which are hereby incorporated by reference.

TECHNICAL FIELD

The present document relates to the test technology of a radio frequency index of an active antenna system, and in particular, to a method and apparatus for testing a radio frequency index of an active antenna system.

BACKGROUND OF THE RELATED ART

The existing traditional base station is generally divided into an active part and an antenna feeder part. The testing for the active part of the base station generally adopts the conduction test method, to connect a radio frequency port of the base station with a test instrument through passive components, such as, a radio frequency cable, an essential attenuation pad, a combiner, etc., to perform a radio frequency index performance test of the base station. And the testing for the antenna feeder part is proceeded in the darkroom or the outdoor far field with the wave-absorbing material, to test its space division characteristics, such as gain, directional diagram, etc. The test contents of the two parts are carried on separately.

An active antenna system (AAS) acts as a base station communication subsystem by integrating a multiple-channel transceiver and a base station antenna, it is an integrated device of the antenna and the multiple-channel transceiver, and the interface between each other is shown as an internal interface, and it is difficult to perform the radio frequency port test directly on the project, which brings challenges to the test of the active antenna system.

The active antenna system is tested by using the traditional conduction test method, and the active part and the antenna feeder part of the active antenna system need to be separated, and a coupling test interface needs to be added in the active part, which will bring the following problems:

1). the integrated topological structure of the active antenna system is destroyed; the design complexity is increased at the same time, and the coupling mode will produce the unnecessary loss;

2). this kind of coupling mode will bring some problems in a testing application, such as, there should be a high requirement on the dynamic range of the test device, etc.;

3). because of the difference among the coupling modes and coupling parameters adopted by various device manufacturers, it brings the difficulty to a unify test authentication and test specification;

4). during the testing, appropriate connectors and devices are required to be configured, and in order to gain the acceptance of the user, the test process and the authentication of the test parameter are required to be explained a lot;

5). the performance index and the spatial character of the antenna interface of the active antenna system are unable to be directly measured, and can only be calculated and converted relying on the antenna parameter index and the active part test, thus the user needs to do a large amount of work for authenticating introduced antenna parameters.

There are other test methods that can be applied to the active antenna system, such as, Over The Air (OTA) test method, which is an overall test method which can realize the active antenna system, including the spatial characteristic test and the radio frequency index testing. However, because this kind of test needs a certain test environment requirement, such as, an indoor far field test needs a darkroom of a certain size; while an outdoor far field test is apt to be influenced by the weather and the external undesired signal, which will bring the problem for both the testing cost and the testing efficiency, and to some test items, for example, test items associated with the production, etc, it is unnecessary to use the OTA.

SUMMARY

The technical problem to be solved by the embodiment of the present document is to provide a method and apparatus for testing a radio frequency index of an active antenna system, by which the radio frequency index of the active antenna system can be directly and effectively measured without need of adding an extra test interface.

In order to solve the above-mentioned technical problem, the following technical scheme is adopted.

A method for testing a radio frequency index of an active antenna system, wherein a tested active antenna system is placed in a test cover for performing radio frequency index testing, and the test cover comprises an antenna array part and a passive network part, and the antenna array part of the test cover is composed of a series of antenna elements having the same structure as elements of an antenna feeder part of the active antenna system; and the method for testing comprises:

calibration of the test cover, including calibrating a loss and a phase offset produced by the test cover;

near-field coupling calibration, including calibrating a near-field coupling test environment of the test cover by using two test covers on which the calibration of the test cover is performed; and performing radio frequency index testing, for putting the active antenna system into the calibrated test cover, and forming a near-field coupling mode with the test cover, wherein, a test environment thereof is the same as a test environment of the near-field coupling calibration, including performing the radio frequency index testing on the active antenna system through a radio frequency test interface on the test cover after compensating the test environment according to a calibration result obtained from a calibration process, and obtaining the radio frequency index of a radio frequency port of the active antenna system.

Alternatively, calibration of the test cover comprises:

antenna array part calibration, for obtaining a gain of each antenna element and a combination gain of the antenna array; and passive network part calibration, for obtaining an amplitude-phase calibration table of the test cover.

Alternatively, the step of the near-field coupling calibration comprises:

branch coupling calibration, for obtaining a branch amplitude-phase calibration table of the near-field coupling; and combining coupling calibration, for obtaining a combining amplitude-phase calibration table of the near-field coupling.

Alternatively, the step of the near-field coupling calibration comprises:

performing the near-field coupling calibration by two test covers, including fixing the two test covers and making orientations of antenna arrays of the two test covers opposite and making a distance between the two test covers within a preset distance range.

Alternatively, the passive network part comprises a branch network, a combination network and a plurality of branch amplitude-phase controllers.

Alternatively, the step of performing the radio frequency index testing comprises:

Testing a branch radio frequency, for obtaining an approximate value of a gain compensation according to the obtained branch amplitude-phase calibration table, and testing the radio frequency index of every branch after compensating the gain of every branch of the active antenna system; and Testing a combining radio frequency, for adjusting a state of every branch amplitude-phase controller of the test cover, assigning a group of amplitude-phase weights for the test cover, and performing weight configuration on the active antenna system according to the amplitude-phase weight; then, obtaining an approximate value of a weight compensation according to the combining amplitude-phase calibration table, and testing the combining radio frequency index under different amplitude-phase weights after compensating the configured weight of the active antenna system with respect to the gain and the phase respectively.

Alternatively, in the step of testing the branch radio frequency, when compensating the gain of every branch of the active antenna system, the compensation is made in a digital domain of the active antenna system, or the compensation is made in the amplitude-phase controller of the test cover.

Alternatively, in the step of testing the combining radio frequency, when compensating the configured weight of the active antenna system, the compensation is in made a digital domain of the active antenna system, or the compensation is made in the amplitude-phase controller of the test cover.

Alternatively, there is a mounting bracket in the test cover, and the active antenna system is installed on the mounting bracket, to form the near-field coupling mode with the test cover.

Alternatively, wave-absorbing material is adopted within a cover body of the test cover.

An apparatus for testing a radio frequency index of an active antenna system, comprises an antenna array part and a passive network part, wherein, the antenna array part of the apparatus is composed of a series of antenna elements having the same structure as elements of an antenna feeder part of the active antenna system; and the passive network part comprises a plurality of branch amplitude-phase controllers, a branch network and a combination network, a near-field coupling mode is formed between the apparatus for testing and the active antenna system;

the amplitude-phase controller is configured to: regulate an amplitude and a phase of a signal of every branch;

the branch network is configured to: connect a signal to every branch respectively, to realize branch testing; and the combination network is configured to: connect a signal of every branch, to realize combining testing.

Alternatively, the branch network comprises: a feed network and a branch connector.

Alternatively, the combination network comprises: a combiner and a combining connector.

An apparatus for testing a radio frequency index of an active antenna system, comprises: an antenna array, an amplitude-phase controller, a feed network, a branch connector, a combiner and a combining connector set in a container body; wherein, the antenna array of the apparatus is composed of a series of antenna elements having the same structure as elements of an antenna feeder part of the active antenna system;

the amplitude-phase controller is connected with the antenna array, used for changing an amplitude and a phase of a branch signal; and one end of the feed network is connected with the amplitude-phase controller, another end is connected with the branch connector to realize branch testing, or the other end connects every branch with the combiner through radio frequency jumpers and realizes combining testing through the combining connector.

Alternatively, the container body is a metal screening box, for shielding internal and external signals of the apparatus for testing.

With the above-mentioned technical scheme, through the near-field coupling mode, the testing of the radio frequency index is performed on the active antenna system, the problem that, for example, an extra coupling test interface needs to be added when using the conduction test method of the traditional base station in the active antenna system test is overcome, and meanwhile it also solves the problems, such as, the testing efficiency, testing cost, etc., brought by the use of the OTA test method.

BRIEF DESCRIPTION OF THE DRAWINGS

The accompanying drawings described herein are used to provide further understanding for the present document and constitute a part of the present application. The illustrated embodiments of the present document and the description thereof are used to explain the present document, rather than constituting an inappropriate limitation on the present document. Wherein.

PREFERRED EMBODIMENTS

For explaining the present document easily, the present document is further described in detail with reference to the accompanying drawings and in combination with embodiments hereinafter. It should be illustrated that, in the case of not conflicting, the embodiments in the present application and features in these embodiments can be combined with each other arbitrarily.

Figure 1:
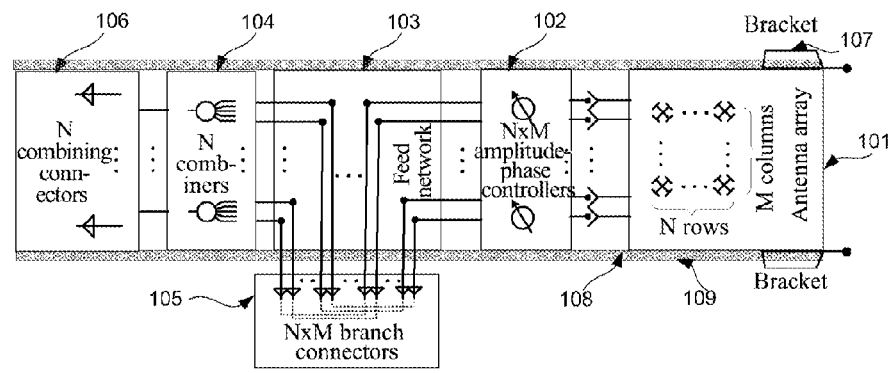
FIG. 1 is a functional block diagram of a test cover of an active antenna according to an embodiment of the present document.

The apparatus for testing the radio frequency index of the active antenna system provided by the present document is equivalent to a testing tool and is called the test cover in the present text, as shown in FIG. 1, mainly made up of several following parts.

An antenna array 101 is composed of a series of antenna elements, the structure and the composition mode of the elements should be identical with those of the antenna feeder part of the active antenna system.

An amplitude-phase controller 102 is an apparatus which can change the phase and amplitude of the signal. It can change the amplitude and phase of the signal of every branch, which is used for verifying capability for adjusting the amplitude and phase of the signal of the active antenna system.

A feed network 103 can distribute the signal flow direction, and can be a coaxial radio frequency cable and can be a radio frequency microstrip line as well, and can change the signal flow direction through the radio frequency jumpers, thus facilitating the testing of branch and the combining.

A combiner 104 can combine the signals from a plurality of test ports and then export, and also can distribute the signals to each test port.

A branch connector 105 is the input/output port of the signal, which connects the test port and the branch feed network and is used for testing the branch.

A combining connector 106 is the input/output port of the signal, which connects the test port and the combiner and is used for testing the combining.

A mounting bracket 107 is configured to: adjust and fix the spatial relationship between the test cover and the tested piece.

Wave-absorbing material 108 is attached to the inner side of the shell of the test cover, can reduce the internal/external signal interference of the test cover, so that there is a good space electromagnetic environments between the test cover and the tested piece.

A metal screening box 109 is the shell of the test cover, and can shield the internal and external signals of the test cover, so that there is a good space electromagnetic shielding ability.

Figures 2A, 2B:
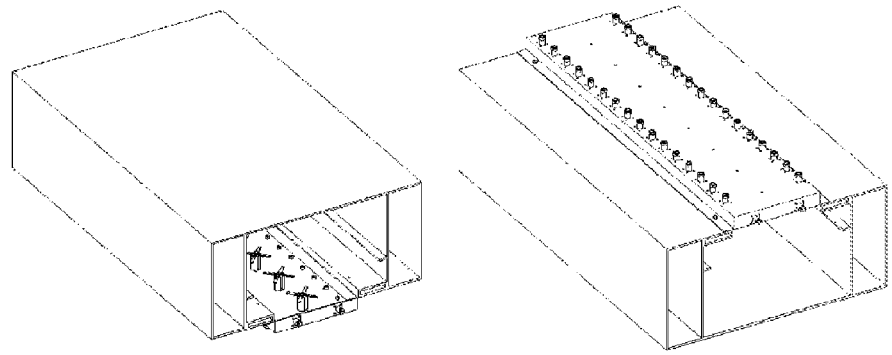
FIGS. 2 (a) and (b) are apparatus diagrams of a test cover of an active antenna with a 2×8 array according to an embodiment of the present document.

FIG. 2 is a diagram of a test cover apparatus of an active antenna with a 2×8 array according to an embodiment of the present document, it is a testing device by extending the antenna feeder part of the tested piece AAS and replacing the active part of the tested piece AAS with the combination network part, etc.

Figure 3:
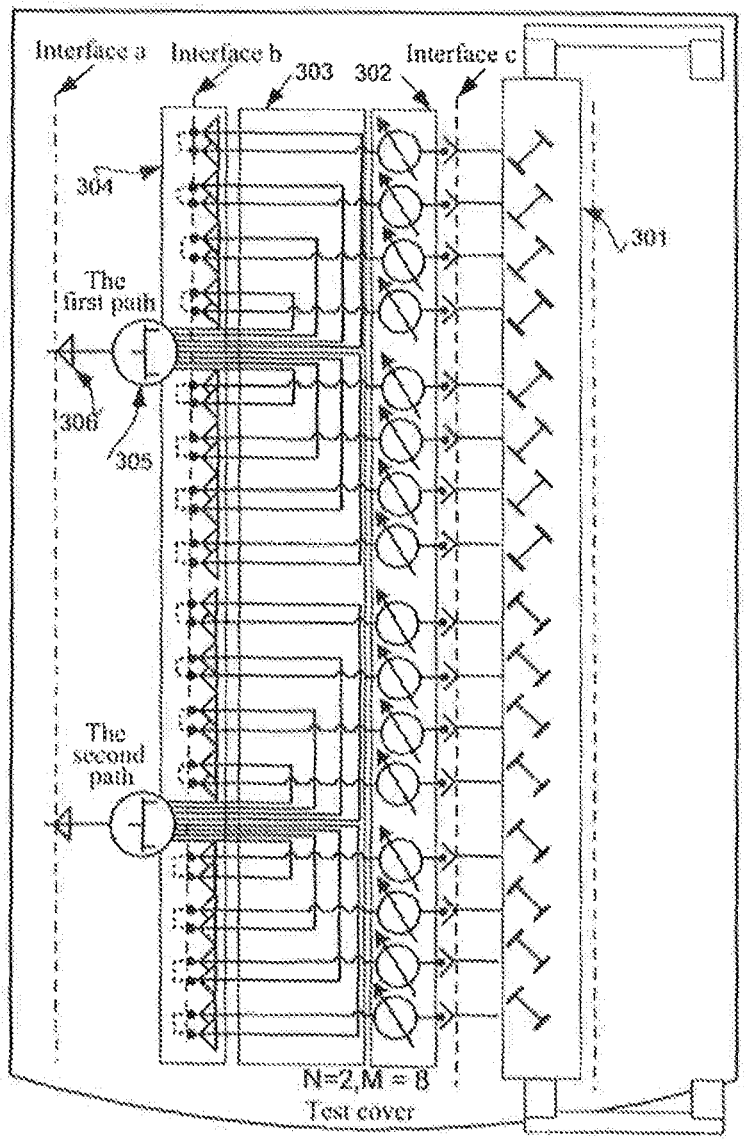
FIG. 3 is a basic composition diagram of a test cover of an active antenna with a 2×8 array according to an embodiment of the present document.

FIG. 3 illustrates the connection mode of each part of the test cover with a 2×8 array of the embodiment of the present document, wherein, the antenna array part 301 is composed of a series of antenna elements having the same structure as elements of the antenna array part of the active antenna system; the amplitude-phase controller 302 is connected with the antenna array 301 through the interface c (that is, the access port of the antenna array of the tested active antenna system), wherein, the interface described in this text can also be called as the test reference surface. The amplitude-phase controller 302 can change the amplitude and phase of the branch signal. The feed network 303 is connected with the branch connector 304 through the interface b, to realize the independent test of every branch. Meanwhile, the radio frequency jumpers can be used to make the signal jump to the combiner 305, and the combining testing is realized through the combining connector 306 on the interface a.

Realizing the testing of radio frequency wireless index of the active antenna system includes three steps, i.e., the calibration of the test cover, the calibration of near-field coupling calibration and the testing of the radio frequency index of the active antenna system, and the specific method is as follows.

1. The Calibration of the Test Cover

In order to test the active antenna system accurately, it needs to calibrate the loss and the phase offset produced by the test cover itself at first. According to the components of the test cover, it falls into the antenna array part calibration and the passive network part calibration again.

The antenna array part calibration is the same as that in the regular antenna testing method, and it needs to be performed in the darkroom or the antenna test field; the gain of each antenna element and the combination gain of the antenna array, etc., can be obtained respectively.

Because the performance of the antenna array part of the active antenna system is determined by the mechanical performance of the antenna design, it can be guaranteed that the performance is stable in the mass production and can meet the retest requirement, the antenna array part calibration work only needs to be performed once or several times, then its feature can be obtained.

The calibration of the passive network part is completed by measuring with the vector network analyzer, and the test cover amplitude-phase calibration table can be obtained.

2. The Test Cover Near-Field Coupling Calibration

Because the test between the test cover and the active antenna system is of a near-field coupling mode, the near-field coupling test environment needs to be calibrated. The calibration interface is defined at the interface c that is connected with the antenna array, that is, the radio frequency port of the active antenna system. Through the calibration of the test cover and near-field coupling calibration, the calibration table of the interface c is calculated finally, and then, after compensating with this calibration table, the radio frequency index of the interface c that can be represented through the test.

The near-field coupling environment is calibrated by two standard test covers (on which calibration is performed). The two standard test covers are fixed through the mounting bracket, so that the orientations of antenna feeder parts of the two test covers are opposite and a distance between the two test covers is fixed according to the requirement.

In order to meet the radio frequency test requirement for the branch and combining of the active antenna system, the near-field coupling calibration is also divided into the branch coupling calibration and the combining coupling calibration. Different test interfaces are measured through the vector network analyzer. With the measurement result, the branch amplitude-phase calibration table and the combining amplitude-phase calibration table of the near-field coupling can be calculated through the amplitude-phase calibration table.

3. The Testing of the Radio Frequency Index of the Active Antenna System

A calibrated test cover is installed and positioned on the active antenna system of the tested piece, and the test environment is the same as that of the near-field coupling calibration, in other words, the tested piece is used to replace one standard test cover therein. According to the test requirement, it is divided into the testing of branch radio frequency and the testing of combining radio frequency.

The testing of branch radio frequency:

for testing every branch of the active antenna system, it needs to compensate the gain of every branch at first. The approximate value of the compensation can be obtained from the branch amplitude-phase calibration table in the calibration process. The compensation of the testing of branch can be made in the digital domain of the active antenna system, and also can be made in the amplitude-phase controller of the test cover; after the compensation, every test can be performed according to the protocol requirement direct against the wireless Base Station (BS) with the AAS in the 3GPP. The test interface is equivalent to the radio frequency port of the active antenna system.

The testing of combining radio frequency:

A group of amplitude-phase weights to be tested are determined at first, through adjusting the state of every branch amplitude-phase controller of the test cover, the group of amplitude-phase weights are assigned to the test cover; during the testing, it needs to compensate the test environment with respect to the gain and the phase respectively. The approximate value of the compensation can be obtained from the combining amplitude-phase calibration table in the calibration process. It can be compensated in the digital domain of the active antenna system, and also can be compensated in the amplitude-phase controller of the test cover; after the compensation is completed, the group of amplitude-phase weights to be tested are assigned to the active antenna system; and then every combining test can be performed according to the protocol requirement direct against the wireless Base Station (BS) with the AAS in the 3GPP. The corresponding test interfaces are different according to the calibration values. The test interface is equivalent to the radio frequency port of the active antenna system.

The implementation of the technical scheme of the present document will be further described specifically in combination with several application examples hereinafter.

1. The Calibration of the Test Cover

Figure 4:
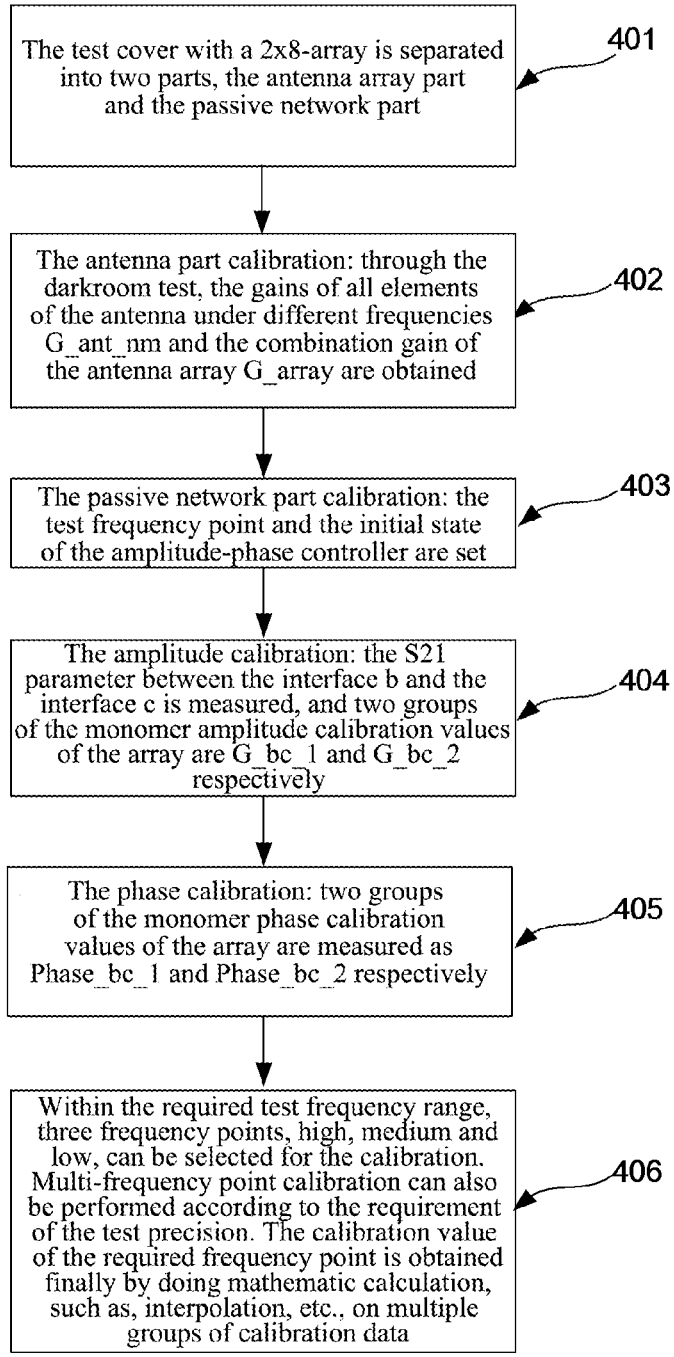
FIG. 4 is a work flow chart of calibration of a test cover of an active antenna with a 2×8 array according to an application example of the present document.

The specific process of the calibration of the test cover is shown as in FIG. 4, mainly including two parts of calibrations: one is the antenna array part calibration, and one is the passive network part calibration.

1.1. The Antenna Array Part Calibration

What is calibrated in the part is the gain of the antenna array part of the test cover, it can be tested in the darkroom or the antenna test far field, and the test method is the same as that in the regular antenna test. The gains of all elements of the antenna under different frequencies $G\_ant\_nm$ (wherein, for the active antenna system with a 2×8-array, n=1, 2; m=1, 2, . . . , 8) and the combination gain of the antenna array $G\_array$ are obtained. Because the antenna array part of the test cover is composed of a series of antenna elements having the same structure as elements of the antenna feeder part of the active antenna system, the test result can be used to represent the performance of the antenna feeder part of the active antenna system.

Because the performance of the antenna feeder part of the active antenna system is determined by the mechanical performance of the antenna design, it can be guaranteed that the performance is stable in the mass production and can meet retest requirement, the antenna array part calibration work only needs to be performed once or several times, then its feature can be obtained.

1.2. The Passive Network Part Calibration

Because the antenna array gain, the size and the conformance of the array gain in the active antenna system are determined through the structure and the spatial arrangement mode of the antenna array, meanwhile the antenna array part of the test cover is composed of a series of antenna elements having the same structure as elements of an antenna feeder part of the active antenna system, in this way, the factor influencing the measurement of the test cover is mainly the passive network part of the test cover.

The passive network part should include the amplitude-phase controller 302, the feed network 303, the branch connector 304, the combiner 305 and the combining connector 306.

The amplitude is calibrated at first, the fixed frequency point is set in an appointed frequency band, the amplitude-phase controller 302 of every branch is set to an initial state, the S21 parameter between the test branch connector 304 (interface b) and the access end of the antenna array 301 (interface c) is measured by using the vector network analyzer, and then the amplitude calibration value $G\_bc\_n$ can be obtained; wherein, the losses of all branches of the first group N=1, $G\_bc\_1$, are defined as $G\_b0\_c0$, $G\_b1\_c0$, . . . , $G\_b7\_c0$ respectively; the losses of all branches of the second group N=2, $G\_bc\_2$, are defined as $G\_b0\_c1$, $G\_b1\_c1$, . . . , $G\_b7\_c1$ respectively; the phase calibration is performed at the same time, according to the distribution of the antenna array, the phase calibration values $Phase\_bc\_n$ are divided as two groups; the first group takes the branch of N=1 and M=1 as the reference, and obtains the phase offsets $Phase\_bc\_1$ among the branches, which are 0, $\Delta phase\_b1\_c0$, $\Delta phase\_b2\_c0$, . . . $\Delta phase\_b7\_c0$ respectively; and the second group takes the branch of N=2 and M=1 as the reference, and obtains the phase offsets $Phase\_bc\_2$ among the branches, which are 0, $\Delta phase\_b1\_c1$, $\Delta phase\_b2\_c1$, . . . $\Delta phase\_b7\_c1$ respectively.

Within a designated test frequency range, three frequency points, high, medium and low, can be selected for the calibration. Multi-frequency point calibration can also be performed according to the requirement of the test precision. The calibration value of the required frequency point is obtained finally by doing mathematic calculation, such as, interpolation, etc., on multiple groups of calibration data.

2. The Test Cover Near-Field Coupling Calibration

Figure 5:
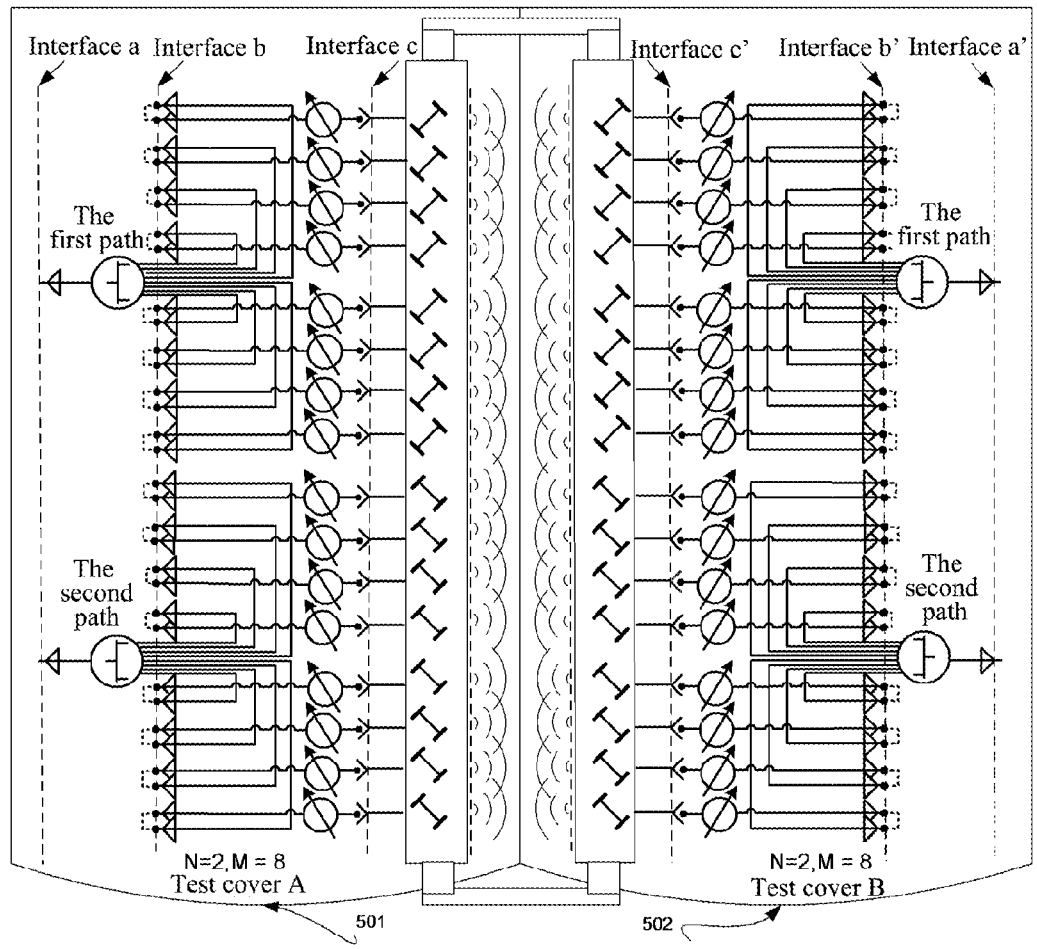
FIG. 5 is a work functional block diagram of near-field coupling calibration of a test cover of an active antenna with a 2×8 array according to an application example of the present document.

Because the test between the test cover and the active antenna system is of a near-field coupling mode, the near-field coupling test environment needs to be calibrated. The working principle of the near-field coupling calibration is described as FIG. 5.

The near-field coupling environment is calibrated by two standard test covers (on which the calibration is performed).

Figure 6:
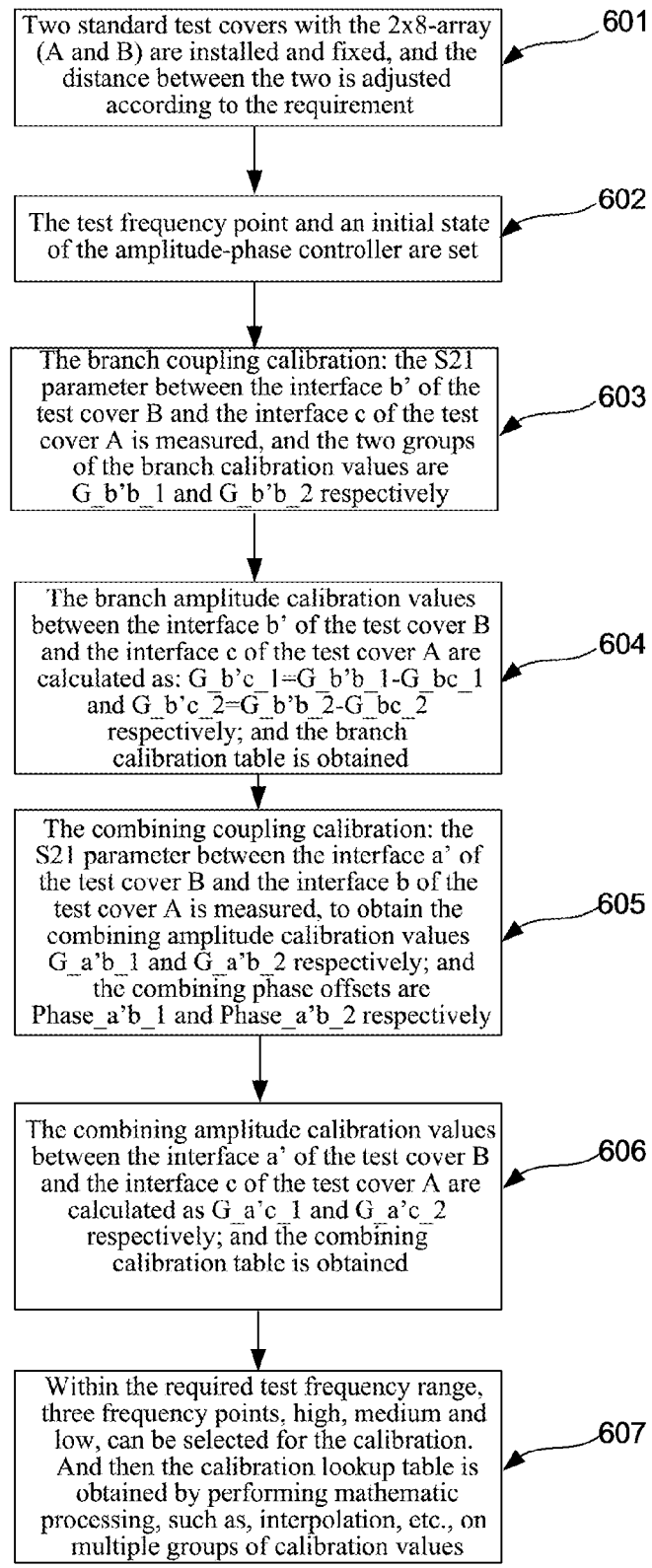
FIG. 6 is a work flow chart of near-field coupling calibration of a test cover of an active antenna with a 2×8 array according to an application example of the present document.

The working process of the near-field coupling calibration is described as FIG. 6. And the specific calibration process is described as follows.

The two standard test covers are expressed as the test cover A (501) and test cover B (502). The two test covers are fixed through the mounting bracket, so that the orientations of antenna feeder parts of the two test covers are opposite and a distance between the two test covers is fixed according to the requirement.

In order to meet the radio frequency test requirement for the branch and combining of the active antenna system, the near-field coupling calibration is also divided into the branch coupling calibration and the combining coupling calibration.

2.1. The Branch Coupling Calibration

The fixed frequency point is set in an appointed frequency band, the S21 parameter between the branch connector port (interface b') of the test cover B (502) and the branch connector port (interface b) of the test cover A (501) is measured by using the vector network analyzer, and then the branch amplitude calibration value G_b'b_n between the two test covers can be obtained; wherein, the losses of all branches of the first group N=1, G_b'b_1, are defined as G_b'0_b0, G_b'1_b0, . . . , G_b'7_b0 respectively; and the losses of all branches of the second group N=2, G_b'b_2, are defined as G_b'0_b1, G_b'1_b1, . . . , G_b'7_b1 respectively.

In this way, if the test cover A is regarded as a tested piece, the loss between the branch connection port (interface b') of the test cover B and the access port (interface c) of the antenna array of the active antenna system, G_b'c_n, can be obtained as:

$$G\_b'c\_n = G\_b'b\_n - G\_bc\_n;$$

wherein, as to the active antenna system with the 2×8-array, it is divided into the two groups, n=1 and 2; and each group has 8 calibration values;

G_b'b_n is a branch amplitude calibration value; and
G_bc_n is an amplitude calibration value.

2.2. The Combining Coupling Calibration

The fixed frequency point is set in an appointed frequency band, and the amplitude-phase controllers of all branches of the two test covers are set to an initial state.

The amplitude is calibrated, the S21 parameter between the combining connector port (interface a') of the test cover B and the branch connector port (interface b) of the test cover A is measured by using the vector network analyzer, and then the loss between the interface a' and the interface b can be obtained. For the active antenna system with the 2×8-array, there are 2 combiners, and there are 2 groups of the combining amplitude calibration values, G_a'b_n; the losses of all branches of the first group N=1, G_a'b_1, are defined as G_a'0_b0, G_b'1_b0, . . . , G_a'0_b7 respectively; and the losses of all branches of the second group N=2, G_a'b_2, are defined as G_a'1_b0, G_b'1_b0, . . . , G_a'1_b7 respectively. The phase calibration is performed at the same time, and the combining phase calibration value Phase_a'b_n is divided as two groups; the first group takes the branch of N=1 and M=1 as a reference, and the combining phase offsets Phase_bc_1 are 0, Δphase_a'0_b1, Δphase_a'0_b2, . . . , Δphase_a'0_b7 respectively; and the second group takes the branch of N=2 and M=1 as a reference, and the combining phase offsets Phase_bc_2 are 0, Δphase_a'1_b1, Δphase_a'1_b2, . . . , Δphase_a'1_b7 respectively.

If the test cover A is regarded as the tested piece, the loss between the combining connection port (interface a') of the test cover B and the access port (interface c) of the antenna array of the tested piece, G_a'c_n, can be obtained as:

$$G\_a'c\_n = G\_a'b\_n - G\_bc\_n;$$

wherein, as to the active antenna system with the 2×8-array, it is divided into the two groups, n=1 and 2; and each group has 8 calibration values;

G_a'b_n is a combining amplitude calibration value; and
G_bc_n is an amplitude calibration value.

The phase offset between the combining connection port (interface a') of the test cover B and the access port (interface c) of the antenna array of the tested piece, Phase_a'c_n, is:

$$Phase\_a'c\_n = Phase\_a'b\_n - Phase\_bc\_n;$$

wherein, as to the active antenna system with the 2×8-array, it is divided into the two groups, n=1 and 2; and each group has 8 calibration values;

Phase_a'b_n is a combining phase calibration value; and
Phase_bc_n is a phase calibration value.

Within the designated test frequency range, three frequency points, high, medium and low, can be selected for the calibration. Multi-frequency point calibration can also be performed according to the requirement of the test precision. The two-dimensional form or curve of the calibration frequency and the calibration value is obtained finally by doing mathematic calculation, such as, interpolation, etc., on multiple groups of calibration data. Based on the difference of the test ports, it is divided into the branch calibration table and the combining calibration table.

The approximate value of the calibration at any frequency point in the appointed frequency band can be obtained by looking up the table.

3. The Testing of Radio Frequency Index of the Active Antenna System

Figure 7:
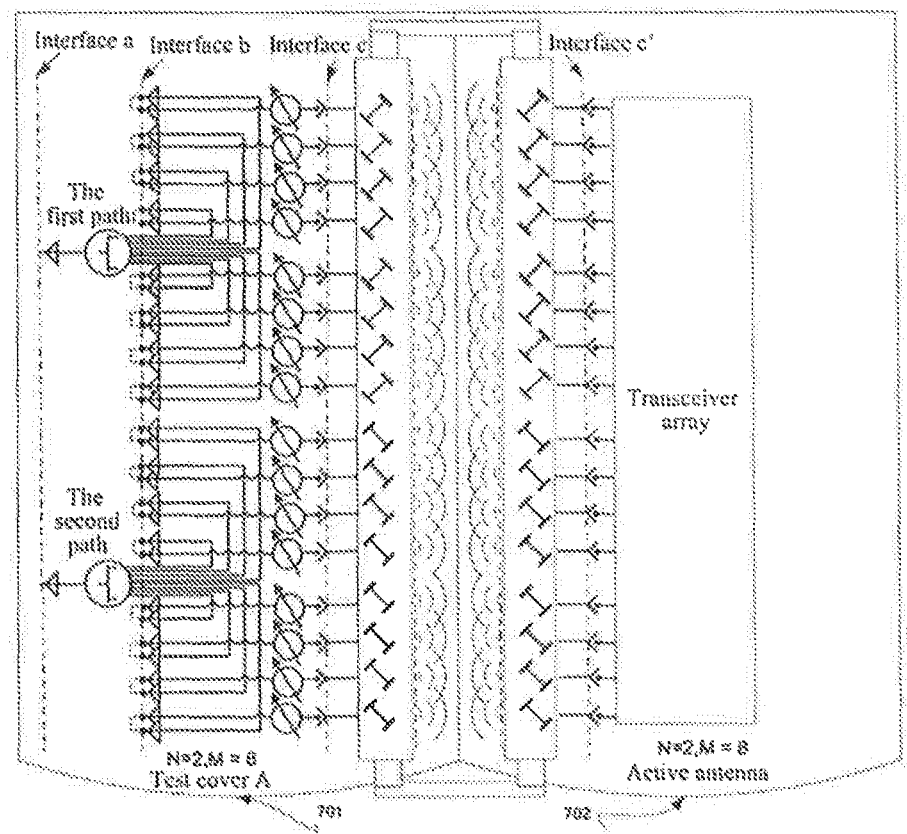
FIG. 7 is a work functional block diagram of the testing of a radio frequency of an active antenna with a 2×8 array according to an application example of the present document.

FIG. 7 shows the working principle of using the test cover to test the radio frequency on the active antenna system with the 2×8-array.

Figure 8:
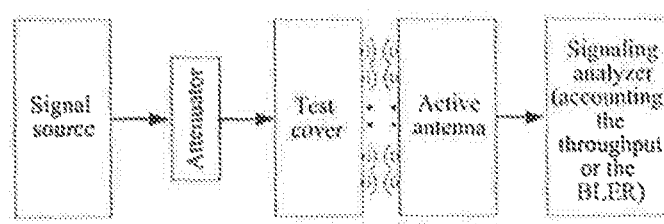
FIG. 8 is a functional block diagram of testing a receiving sensitivity by a test cover according to an application example of the present document.
Figure 9:
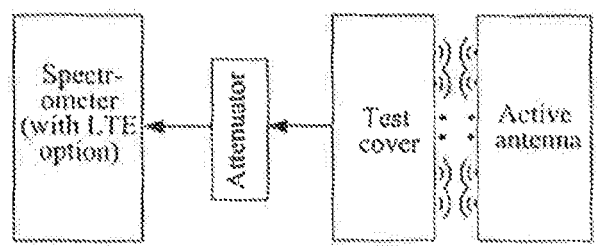
FIG. 9 is a functional block diagram of testing an adjacent channel power leakage ratio (ACLR) by a test cover according to an application example of the present document.
Figure 10:
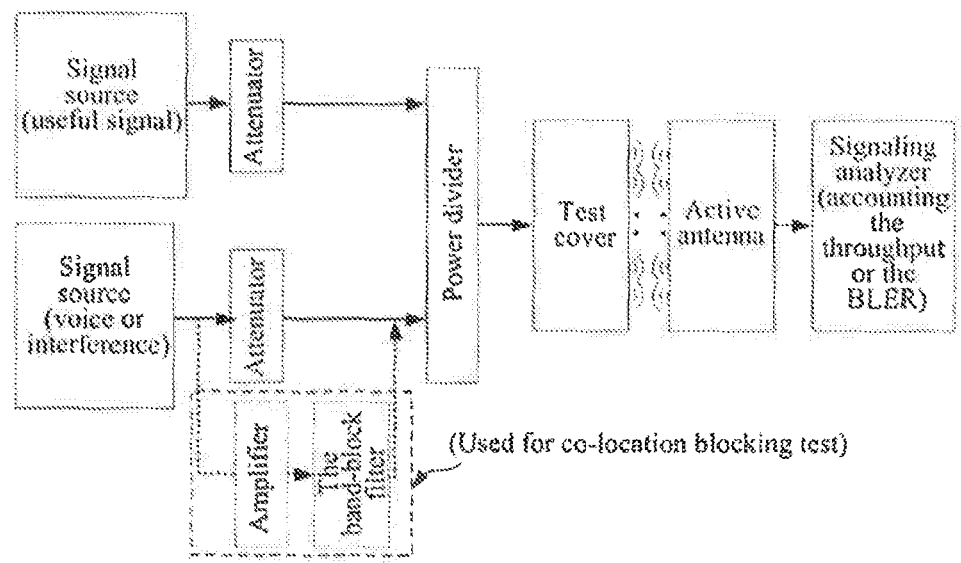
FIG. 10 is a functional block diagram of testing an uplink blocking by a test cover according to an application example of the present document.

FIG. 8, FIG. 9 and FIG. 10 show components associated with the steps of the testing of the main radio frequency index of the active antenna system under the FDD LTE work mode respectively.

Using the components shown in FIG. 8, the specific implementation steps for testing the uplink sensitivity radio frequency wireless index of the active antenna system by using the test cover are as follows.

The test environment is established according to the networking.

The test cover and the test environment of the piece to be tested of the active antenna system are installed and fixed, every branch amplitude-phase controller of the test cover is adjusted to an initial state, the external test devices (the attenuator, the signal source, the signaling analyzer, etc.) are connected, and other receiving ports which are not used by the test cover are connected to the matched load.

The calibration value of the test environment is compensated.

The calibration value of the test environment is compensated, and the calibration value (including the gain and the phase offset) is obtained from the calibration table during the calibration process. The compensation can be performed in the digital domain of the active antenna system, and also can be finished in the amplitude-phase controller.

The uplink reference sensitivity is tested.

The active antenna system is started, the working frequency point of the carrier and the channel bandwidth are configured; the vector signal source is set, and the uplink reference measurement signal is output.

a). the branch reference sensitivity test mainly includes the following steps.

In step a.1), the signal source is connected to the branch connector to be tested, the useful signal power is adjusted, to make the throughput not lower than 95% of the maximum throughput of the column reference measurement channel, and the useful signal power is recorded; the maximum throughput=the payload*1000, and the payload is the Payload size (bits) in the fixed reference measurement channel (FRC).

In step a.2), the three, high, medium and low, frequency points are tested, and the step a.1) is repeated.

In step a.3), other branches of the active antenna system are tested, and the steps a.1)-a.2) are repeated.

b). the combining reference sensitivity test mainly includes the following steps.

In step b.1), according to the test requirement, through changing the state of the amplitude-phase controller of every branch of the test cover at first, one group of amplitude-phase weights are assigned to the test cover, and then a same amplitude-phase weight is configured to the active antenna system.

In step b.2), the signal source is connected to the combining connector to be tested, the useful signal power is adjusted, until the throughput of the eNB is not lower than 95% of the maximum throughput of the column reference measurement channel, and the useful signal power is recorded; the maximum throughput=the payload*1000, and the payload is to the Payload size (bits) in the fixed reference measurement channel (FRC).

In step b.3), the three, high, medium and low, frequency points are tested, and the step b.2) is repeated.

In step b.4), the state of every branch amplitude-phase controller of the test cover is adjusted, and a same configuration is performed on the active antenna system at the same time, and then the step b.2)~step b.3) are repeated, which can verify the index under different weights.

In step b.5), other combinings of the active antenna system are tested, and the steps b.2)~step b.4) are repeated.

FIG. 9 shows components associated with testing the ACLR radio frequency wireless index of the active antenna system by using the test cover. Exemplary steps for performing this testing are as follows.

The test environment is established according to the networking.

The test cover and the test environment of the piece to be tested of the active antenna system are installed and fixed, every branch amplitude-phase controller of the test cover is adjusted to an initial state, the external test devices (the attenuator, the spectrometer, etc.) are connected, and other receiving ports which are not used by the test cover are connected to the matched load.

The calibration value of the test environment is compensated.

The calibration value of the test environment is compensated, and the calibration value (including the gain and the phase offset) is obtained from the calibration table during the calibration process. The compensation can be performed in the digital domain of the active antenna system, and also can be finished in the amplitude-phase controller.

The adjacent channel power leakage ratio (ACLR) is tested.

The active antenna system is started, the device is fully preheated, and the performance index is in the stable state; the frequency point of the carrier, and the downlink signal with the channel width of 20 MHz are configured.

Alternatively, the branch ACLR test process includes the following main steps.

In step 1), the spectrometer is connected to the branch connector to be tested, and the power of the active antenna system is adjusted to the nominal output power according to the E_TM1.1 test mode of the 3GPP TS 36.104.

In step 2), the ACLR is tested by utilizing the vector signal analyzer and is recorded.

In step 3), the downlink signal is configured according to the E_TM1.2 test mode, and step 1)~step 2) are repeated.

In step 4), the three, high, medium and low, frequency points are tested, and the step 1)~step 3) are repeated.

In step 5), other branches of the active antenna system are tested, and the steps 1)~4) are repeated.

Alternatively, the combining ACLR test process includes the following main steps.

In step 1), according to the test requirement, through changing the state of the amplitude-phase controller of every branch of the test cover at first, one group of amplitude-phase weights are assigned to the test cover, and then a same amplitude-phase weight is configured to the active antenna system.

In step 2), the spectrometer is connected to the combining connector to be tested, and the power of the active antenna system is adjusted to the nominal output power according to the E_TM1.1 test mode of the 3GPP TS 36.104.

In step 3), the ACLR is tested by utilizing the spectrum analyzer and is recorded.

In step 4), the downlink signal is configured according to the E_TM1.2 test mode, and step 2)~step 3) are repeated.

In step 5), the three, high, medium and low, frequency points are tested, and the step 2)~step 4) are repeated.

In step 6), the state of every branch amplitude-phase controller of the test cover is adjusted, and a same configuration is performed on the active antenna system at the same time, and then the step 2)~step 5) are repeated, which can verify the index under different weights.

In step 7), other combinings of the active antenna system are tested, and the steps 2)~6) are repeated.

FIG. 10 illustrates components associated with testing the uplink blocking radio frequency wireless index of the active antenna system by using the test cover. Exemplary steps for performing this testing are as follows.

The test environment is established according to the networking.

The test cover and the test environment of the piece to be tested of the active antenna system are installed and fixed, every branch amplitude-phase controller of the test cover is adjusted to an initial state, the external test devices (the attenuator, the signal source, the signaling analyzer, etc.) are connected, and other receiving ports which are not used by the test cover are connected to the matched load.

The calibration value of the test environment is compensated.

The calibration value of the test environment is compensated, and the calibration value (including the gain and the phase offset) is obtained from the calibration table during the calibration process. The compensation can be performed in the digital domain of the active antenna system, and also can be finished in the amplitude-phase controller.

The blocking is tested.

The active antenna system is started, the working frequency point of the carrier and the channel bandwidth are configured; the vector signal source is set according to the 3GPP TS 36.104 protocol, and the useful signal is sent, and the output level is PREFSENS+6 dB.

Alternatively, the branch blocking test process includes the following main steps.

In step 1), the output end of the power divider is connected to the branch connector to be tested.

In step 2), the narrowband blocking test is performed, the interference signal source sends the interference signal, the center frequency of the interference signal deviates from the useful signal carrier edge by 340+m*180 [Khz], wherein, m=0, 1, 2, 3, 4, 9, 14, 19, 24; and the interference signal is a 5 MHz E-UTRA signal with 1 RB.

In step 3), the in-band blocking test is performed, the interference signal generator sends the interference signal, the center frequency range of the interference signal is from (2300−20 M) to (2400 M+20 M); and the interference signal is a 5 MHz E-UTRA signal.

In step 4), the out-band blocking test is performed, the interference signal generator sends the interference signal, 1 M~(2300−20 M), (2400 M+20 M)~12.75 G; and the interference signal is the CW wave.

In step 5), the co-location blocking test is performed, the interference signal source sends the interference signal through the amplifier and the band elimination filter, and the frequency range is determined according to the protocol requirement; and the interference signal is the CW wave.

In step 6), the output level is adjusted, to make the throughput not lower than 95% of the maximum throughput of the column reference measurement channel, and the interference signal power is recorded; the maximum throughput=the payload*1000, and the payload is to the Payload size (bits) in the fixed reference measurement channel (FRC).

In step 7), the three, high, medium and low, frequency points are tested, and the steps 2)~6) are repeated.

In step 8), other branches of the active antenna system are tested, and the steps 1)~7) are repeated.

Alternatively, the combining blocking test process includes the following main steps.

In step 1), according to the test requirement, through changing the state of the amplitude-phase controllers of every branch of the test cover at first, one group of amplitude-phase weights are assigned to the test cover, and then a same amplitude-phase weight is configured to the active antenna system.

In step 2), the output end of the power divider is connected to the combining connector to be tested.

In step 3), the narrowband blocking test is performed, the interference signal source sends the interference signal, the center frequency of the interference signal deviates from the useful signal carrier edge by 340+m*180 [Khz], wherein, m=0, 1, 2, 3, 4, 9, 14, 19, 24; and the interference signal is a 5 MHz E-UTRA signal with 1 RB.

In step 4), the in-band blocking test is performed, the interference signal generator sends the interference signal, the center frequency range of the interference signal is from (2300-20 M) to (2400 M+20 M); and the interference signal is a 5 MHz E-UTRA signal.

In step 5), the out-band blocking test is performed, the interference signal generator sends the interference signal, 1 M~(2300−20 M), (2400 M+20 M)~12.75 G; and the interference signal is the CW wave.

In step 6), the co-location blocking test is performed, the interference signal source sends the interference signal through the amplifier and the band elimination filter, and the frequency range is determined according to the protocol requirement; and the interference signal is the CW wave.

In step 7), the output level is adjusted, to make the throughput not lower than 95% of the maximum throughput of the column reference measurement channel, and the interference signal power is recorded; the maximum throughput=the payload*1000, and the payload is to the Payload size (bits) in the fixed reference measurement channel (FRC).

In step 8), the three, high, medium and low, frequency points are tested, and the steps 2)~7) are repeated.

In step 9), the state of every branch amplitude-phase controller of the test cover is adjusted, and a same configuration is performed on the active antenna system at the same time, and then the step 2)~step 8) are repeated, which can verify the index under different weights.

In step 10), other combinings of the active antenna system are tested, and the steps 2)~9) are repeated.

In sum, by adopting the method and apparatus for testing of the embodiment of the present document, the test of the branch radio frequency index of the active antenna system can be realized, and also the test of the combining radio frequency index can be realized. Compared with the related art, with the embodiment of the present document, the testing of radio frequency index is performed on the active antenna system through the near-field coupling mode, a series of problems brought by the traditional conduction test requiring to add extra coupling interfaces when testing the active antenna system are overcome; and the testing efficiency problem brought by the OTA test also can be solved very well. And also the differentiation problem of the test requirement by different types of active antenna products is solved at the same time. On the premise of guaranteeing the test requirement, the testing cost is saved, the testing efficiency is improved, and the user can accept and authorize very easily at the same time.

The above description is only for the preferred embodiments of the present document and is not intended to limit the present document. The present document can have a variety of other embodiments. Those skilled in the art can make the corresponding modifications and variations according to the present document without departing from the spirit and essence of the present document, however, all of these modifications or the variations should be embodied in the scope of the appended claims of the present document.

Obviously, it can be understood by those skilled in the art that each module or each step above-mentioned in the present document can be implemented by universal calculating apparatus, and they can be integrated in a single calculating apparatus, or distributed in the network consisted of a plurality of calculating apparatus. Alternatively, they can be implemented by the program codes executable by the calculating apparatus. Accordingly, they can be stored in the storage apparatus and implemented by the calculating apparatus, and in some cases, the steps illustrated or described here can be executed with an order different from here, or they are made into various integrated circuit modules respectively, or a plurality of modules or steps therein are made into the single integrated circuit module to be implemented. By this way, the present document is not limited to any specific form of the combination of the hardware and software.

INDUSTRIAL APPLICABILITY

By adopting the method and apparatus for testing of the embodiment of the present document, the test of the branch radio frequency index of the active antenna system can be realized, and also the test of the combining radio frequency index can be realized. Compared with the related art, with the embodiment of the present document, the testing of radio frequency index is performed on the active antenna system through the near-field coupling mode, a series of problems brought by the traditional conduction test requiring to add extra coupling interfaces when testing the active antenna system are overcome; and the testing efficiency problem brought by the OTA test also can be solved very well. And also the differentiation problem of the test requirement by different types of active antenna products is solved at the same time. On the premise of guaranteeing the test requirement, the testing cost is saved, the testing efficiency is improved, and the user can accept and authorize very easily at the same time. Therefore, the present document has very strong industrial applicability.

What we claim is:

1. A method for testing radio frequency index of an active antenna system, comprising:
    placing the active antenna system in a test cover for testing the radio frequency index, wherein the test cover comprises an antenna array part and a passive network part, and the antenna array part of the test cover is the same as an antenna feeder part of the active antenna system;
    calibrating a loss and a phase offset produced by the test cover;
    calibrating a near-field coupling test environment of the test cover by using two test covers on which the calibration of the test cover is performed;
    the active antenna system and the calibrated test cover forming a near-field coupling mode, wherein a test environment thereof is the same as the near-field coupling test environment; and
    testing the radio frequency index on the active antenna system through a radio frequency test interface on the test cover after compensating the test environment according to a calibration result obtained from a calibration process, and obtaining the radio frequency index of a radio frequency port of the active antenna system.

2. The method for testing according to claim 1, wherein calibrating the test cover comprises:
    the antenna array part obtaining a gain of each antenna element and a combination gain of the antenna array; and
    the passive network part obtaining an amplitude-phase calibration table of the test cover.

3. The method for testing according to claim 1, wherein calibrating the near-field coupling comprises:
    calibrating a branch coupling, for obtaining a branch amplitude-phase calibration table of the near-field coupling; and calibrating a combining coupling, for obtaining a combining amplitude phase calibration table of the near-field coupling.

4. The method for testing according to claim 1, wherein calibrating the near-field coupling comprises: calibrating the near-field coupling by the two test covers on which the calibration has been performed, fixing the two test covers and making orientations of antenna arrays of the two test covers opposite and making a distance between the two test covers within a preset distance range.

5. The method for testing according to claim 1, wherein the passive network part comprises a branch network, a combination network and a plurality of branch amplitude-phase controllers.

6. The method for testing according to claim 5, wherein the step of testing the radio frequency index comprises:
    testing a branch radio frequency, for obtaining an approximate value of a gain compensation according to the obtained branch amplitude-phase calibration table, and testing radio frequency index of every branch after compensating a gain of every branch of the active antenna system; and
    testing a combining radio frequency, for adjusting a state of every branch amplitude-phase controller of the test cover, assigning a group of amplitude-phase weights for the test cover, and performing a weight configuration on the active antenna system according to the amplitude-phase weight; then, obtaining an approximate value of a weight compensation according to the combining amplitude-phase calibration table, and combining the testing of radio frequency index under different amplitude-phase weights after compensating the configured weight of the active antenna system with respect to the gain and phase respectively.

7. The method for testing according to claim 6, wherein, in the testing of the branch radio frequency, when compensating the gain of every branch of the active antenna system, the compensation is made in a digital domain of the active antenna system, or the compensation is made in an amplitude-phase controller of the test cover.

8. The method for testing according to claim 6, wherein, in the testing of the combining radio frequency, when compensating the configured weight of the active antenna system, the compensation is made in a digital domain of the active antenna system, or the compensation is made in an amplitude-phase controller of the test cover.

9. The method for testing according to claim 1, wherein there is a mounting bracket in the test cover, and the active antenna system is installed on the mounting bracket, to form the near-field coupling mode with the test cover.

10. The method for testing according to claim 1, wherein wave-absorbing material is adopted within a cover body of the test cover.

11. A test cover for testing radio frequency index of an active antenna system, comprising:
    an antenna array part and a passive network part, wherein the antenna array part of the test cover is the same as an antenna feeder part of the active antenna system; and the passive network part comprises a plurality of branch amplitude-phase controllers, a branch network and a combination network;
    wherein a near-field coupling mode is formed between the test cover and the active antenna system;
    wherein the amplitude-phase controller is configured to regulate an amplitude and a phase of a signal of every branch;
    wherein the branch network is configured to connect a signal to every branch respectively, to realize branch testing; and
    wherein the combination network is configured to connect a signal of every branch, to realize combining testing.

12. The test cover according to claim 11, wherein the branch network comprises: a feed network and a branch connector.

13. The test cover according to claim 11, wherein the combination network comprises: a combiner and a combining connector.

14. A test cover for testing radio frequency index of an active antenna system, comprising: an antenna array, an amplitude-phase controller, a feed network having a first end and a second end, a branch connector, a combiner and a combining connector set in a container body; wherein:
    the antenna array of the test cover is the same as an antenna feeder part of the active antenna system;
    the amplitude-phase controller is connected with the antenna array, used for changing an amplitude and a phase of a branch signal; and
    the first end of the feed network is connected with the amplitude-phase controller and the second end of the feed network is connected with the branch connector to realize branch testing; the first end of the feed network is connected with the amplitude-phase controller and the second end connects, by radio frequency jumpers, every branch with the combiner to realize combining testing through the combining connector.

15. The test cover according to claim 14, wherein the container body is a metal screening box, for shielding internal and external signals of the test cover.

* * * * *